3,502,590
PROCESS FOR PREPARING PHOSPHOR
Martin R. Royce, Lancaster, Pa., and Soren M. Thomsen, Pennington, and Perry N. Yocom, Princeton, N.J., assignors to RCA Corporation, a corporation of Delaware
No Drawing. Filed Mar. 1, 1967, Ser. No. 619,587
Int. Cl. C09k 1/14
U.S. Cl. 252—301.4                    10 Claims

ABSTRACT OF THE DISCLOSURE

A process for preparing luminescent materialss consisting essentially of europium-activated oxysulfides of yttrium, gadolinium, lanthanum and/or lutetium. The process is comprised of heating at a temperature between 700 and 1250° C., a mixture including (1) at least one oxide of the group consisting of yttrium, gadolinium, lanthanum and lutetium, (2) a compound of europium, (3) a composition which yields alkali metal sulfides and polysulfides upon heating, (4) and, optionally, at least one member of the group consisting of sulfates, phosphates, arsenates, and germanates of alkali metals, and then cooling the heated mixture.

BACKGROUND OF THE INVENTION

Prior art methods for preparing europium-activated oxysulfides of yttrium, gadolinium, lanthanum and lutetium include heating a mixture of oxygen-containing compounds of these cations in an atmosphere containing elemental sulfur gas or a gaseous sulfide, such as hydrogen sulfide or carbon disulfide, until the desired oxysulfides are produced. Such prior methods, employing a gas as a reactant, frequently yield non-homogeneous products and multiple heatings may be required to achieve complete conversion and homogeneity. Also, such prior methods are suitable only for small batches, because gas access to the interior becomes more difficult as the size of the batch increases. Using an ambient reactant gas for producing larger commercial size batches requires equipment that is more elaborate than that which is generally practical to be used in the factory for making phosphors. In addition, the venting of copius quantities of unreacted gases and of gaseous byproducts may result in an unhealthy condition in the neighborhood of the factory. In addition to homogeneity and cost, it is desirable that further improvements be made in the product by increasing the light output and the efficiency of these phosphors, and by improving the physical properties thereof for the purpose of facilitating subsequent processing in fabricating electronic devices.

SUMMARY

The novel process disclosed herein for making luminescent europium-activated oxysulfides of yttrium, gadolinium, lanthanum and lutetium includes the steps of heating at temperatures between 700 and 1250° C. a mixture including (1) at least one oxide of the group consisting of yttrium, gadolinium, lanthanum and lutetium; (2) a compound of europium; the molar ratio of the europium in said compound to the yttrium plus gadolinium plus lanthanum plus lutetium in said oxides being in the range of about 0.001 and 0.1, (3) and a composition which yields alkali metals sulfides and polysulfides upon heating; and then cooling said heated mixture. The composition which yields the sulfides and polysulfides recited in this method is preferably an alkali thiosulfate, or a combination of sulfur and an alkali carbonate.

By this novel process, these phosphors are prepared without the need for an ambient gas reactant, thereby obviating the need for special manufacturing equipment for handling such reactant gases and of copious quantities of gaseous products. The sulfur required to convert the oxides to the oxysulfides is supplied by the alkali sulfides and polysulfides which are in a molten mass at the heating temperatures. The novel process is more easily carried out in the factory than previous methods, especially where large quantities of the phosphor are to be made. Additionally, since the sulfides are more intimately mixed and more completely retained in the batch, the phosphor product is more homogeneous obviating the need for multiple heatings of the mixture. On the average, the phosphors made by the novel process exhibit a brighter luminescence than phosphors made by the previous processes.

Further improvements in the efficiency and homogeneity of the luminescent products are achieved by including in the mixture, at least one member of the group consisting of sulfates, phosphates, arsenates and germanates of alkali metals.

DESCRIPTION OF THE PREFERRED EMBODIMENTS

Example 1

To prepare a europium-activated lanthanum oxysulfide, (La, Eu)$_2$O$_2$S having a Eu/La mol ratio equal to about 0.05, proceed as follows. Slurry with acetone about 16 grams (0.05 mol) La$_2$O$_3$ powder and about 0.88 gram (0.0025 mol) Eu$_2$O$_3$ powder and ball mill the slurry for about 30 minutes to mix well. Dry the slurry. To the dry oxide mixture remaining, add about 12 grams (0.075 mol) anhydrous sodium thiosulfate Na$_2$S$_2$O$_3$ powder and mix well by shaking, rolling and/or both. Heat this mixture in an alumina crucible or other vessel at about 1100° C. for about 60 minutes suitably shielded from air either by a nitrogen atmosphere or by a nearly-closed well-filled vessel. Then, cool the product and wash the yellow product free of water-soluble solids with water to produce a nearly-white finished phosphor that is insoluble in water. The phosphor emits light with a peak wavelength at about 6260 A. upon excitation with an electron beam.

Example 2

To prepare a europium-activated lanthanum oxysulfide, (La, Eu)$_2$O$_2$S having a Eu/La mol ratio equal to about 0.05, proceed as follows. Slurry with acetone about 16 grams (0.05 mol) La$_2$O$_3$ powder and about 0.88 gram (0.0025 mol) Eu$_2$O$_3$ powder and ball mill the slurry for about 30 minutes to mix well. Dry the slurry. To the dry oxide mixture remaining, add 1.8 gram sodium carbonate Na$_2$CO$_3$, 2.3 grams potassium carbonate K$_2$CO$_3$ and 3.2 grams sulfur, and mix well as by shaking, rolling or both. Pack the dry mixture into a container and then proceed as in Example 1.

In both of Examples 1 and 2, the oxides of europium and lanthanum are reacted with a molten mixture containing sulfide or polysulfides of sodium during the heating step. By virtue of the molten characteristic of this mixture, the oxides of lanthanum and europium are more completely and more homogeneously reacted with the sulfides to produce the desired oxysulfides than by previous processes using gaseous reactants. This is achieved with the use of only the very simplest in equipment and may be conducted in smaller or larger batches in the same manner. In both of Examples 1 and 2, the molten mixtures including the sulfides and polysulfides are produced during the reaction from some of the ingredients that are present in the initial batch. In Example 1, the molten sulfides and polysulfides are produced by the thermal decomposition of the sodium thiosulfate that is present in the batch. In Example 2, the molten sulfides and polysulfides are produced by the thermal reaction of sulfur with the sodium and potassium carbonates that are present in the batch. The heating can be carried out in the range of 750° C. to about 1250° C. The heating times are preferably about one hour for small samples (about 20 grams) to about 4 hours for larger samples (about 250 grams) for best results.

Any mixture which upon heating produces molten mixtures containing sulfides and/or polysulfides of alkali metals may be used. Thus, any of the alkali metals may be substituted for sodium and/or potassium in Examples 1 and 2, and anions other than carbonates which will produce such molten sulfides and polysulfides may replace the carbonates.

Other substitutions may be made in both of Examples 1 and 2 which are regarded as equivalents. Where the phosphor is intended for use in shadow mask type color television picture tubes, the reaction product should contain about 3 to 8 mol percent europium. Other concentrations of europium may be used to produce phosphors of different color emission characteristics and efficiencies. Yttrium, gadolinium and/or lutetium may be substituted for part or all of the lanthanum. In place of oxides of these cations, one may use compounds which, upon heating, yield oxides. One or more of the other alkali metals, e.g. lithium and potassium, may be substituted for sodium. The raw materials used in the batch should be substantially free of impurities. This applies particularly to oxides and other compounds of yttrium and the lanthanides.

Further improvements in brightness and homogeneity in the product may be achieved through the inclusion in the batch, sulfates, phosphates, arsenates, and/or germanates of one or more alkali metals. After heating the batch, these additives are washed out of the reaction product. The following Examples 3, 4 and 5 illustrate the inclusion of an alkali sulfate.

Example 3

Prepare a batch comprised of the following powders: 25.8 grams $Y_2O_3$; 1.92 grams $Eu_2O_3$; 8.0 grams $Na_2CO_3$; 8.0 grams $Na_2SO_4$ and 8.0 grams sulfur. Intimately mix the batch and then heat the mixture in a covered crucible at about 1150° C. for about one hour and then cool. Wash the reaction product in water and extract the white water-insoluble phosphor by filtration and then dry. The resulting product is $(Y, Eu)_2O_2S$ containing about 4 mol percent europium in solid solution. This product is cathodoluminescent, emitting red light with a peak wavelength at about 6260 A.

Example 4

Follow the procedure described in Example 3 except that the batch is comprised of: 200 grams of a powder comprised of a solid solution of the formulation 0.955 $Y_2O_3$; 0.045 $Eu_2O_3$; 59 grams $Na_2CO_3$; 59 grams S; 45 grams $Li_2SO_4$; and 16.3 grams $K_2SO_4$. Heat this batch for about three hours instead of about one hour. The resulting phosphor is similar to that produced with Example 3.

Example 5

Follow the procedure described in Example 3 except that the batch is comprised of 129.0 grams $Y_2O_3$; 9.6 grams $Eu_2O_3$; 20.0 grams $Li_2CO_3$; 9.5 grams $K_2SO_4$; 36.0 grams sulfur. Heat this batch for about three hours instead of about one hour. The resulting phosphor is similar to that produced with Example 3.

In Examples 3, 4, and 5, the alkali metal sulfates that are present should form a low melting mixture during the heating step. For example, a desirable mixture of sulfates is the eutectic mixture comprised of 80 mol percent $Li_2SO_4$ with 20 mol percent $K_2SO_4$.

The following are some examples of the novel process in which the batch includes an alkali metal phosphate.

Example 6

Prepare a batch comprised of 1 mol $Y_2O_3$; 0.05 mol $Eu_2O_3$; 0.68 mol $Na_2CO_3$; 2.25 mol S; and 5 weight percent $K_3PO_4$. The components of the batch are dry mixed together and then the batch is packed in a quartz container, covered, and then heated at about 1150° C. for about one hour. The reaction product is then washed in water about three times by decantation to remove water-soluble material and then dried and screened. The resulting phosphor product has the molar formula $(Y, Eu)_2O_2S$ wherein the ratio Eu to Y is about .05. The phosphor is cathodoluminescent, emitting light with a peak wavelength at about 6260 A.

In the process described in Example 6, a wide range of conditions can be used to make phosphors for use in color television picture tubes. Some preferred ranges (although wider ranges are usable) are: Eu between 0.043 and 0.052 mol per mol $Y_2O_3$; $Na_2CO_3$ between 0.5 and 0.8 mol per mol $Y_2O_3$; S between 1.5 and 3.5 mols per mol $Y_2O_3$; $K_3PO_4$ between 3 and 9 weight percent of the entire batch. The heating temperatures are preferably between 1000 and 1250° C. with heating times preferably between 0.05 and 1.5 hours.

In place of $K_3PO_4$, any other alkali metal phosphate or combination of such phosphates may be used. For example, the following phosphates have been used successfully: $Na_3PO_4$, $KH_2PO_4$, $Li_3PO_4$, $(NH_4)_2HPO_4$. In place of alkali metal phosphates, alkali metal arsenates, and alkali metal germanates may be used. Lithium arsenate, sodium arsenate, and potassium arsenate each have been used in the novel process to produce useful phosphors.

The use of alkali metal phosphate in the batch has been found to yield more efficient phosphors. This is believed to be accomplished through better incorporation of the activator in the phosphor and by a scavenging action of the phosphate ions for other cations, such as $Ca^{2+}$, which are known to be poisonous when incorporated in the desired phosphors. Also, the phospate addition has the advantage over the sulfate addition as exemplified in Examples 3, 4, and 5 in that it produces less of glass phase in a silica container. This results in easier handling of the reaction product and a higher yield of useful phosphor. Also, considerably less phosphate additive is required. In the case of the sulfate addition, about 20 weight percent is optimum, whereas only about 5 weight percent phosphate is optimum. This results in reduced material cost as well as increased capacity for the same sized heating containers.

Example 7

The following is an example for practicing the invention in preparing a relatively large batch of phosphor. Blend in dry form the following batch:

| | Percent | Weight (lbs.) |
| --- | --- | --- |
| Yttrium oxide | 95.7 (mol) | 55.2 |
| Europium oxide | 4.3 (mol) | 3.8 |
| Sodium carbonate | 29.5 (wt.) | 17.4 |
| Sulfur | 29.5 (wt.) | 17.4 |
| Potassium phosphate | 5.0 (wt.) | 4.7 |

Then, pack the blended dry batch evenly into refractory containers. One type of suitable container is a five liter silica dish standing about six inches high. Cover and then heat the containers at about 1150° C. for about 5.25 hours, and then cool to room temperature. After removing the outer layer of oxidized material in each container, mill together the remaining reaction product from all of the containers in water for about 10 minutes and then screen through a 30 mesh screen. After washing, place the remaining material in trays and dry at about 200° C. Screen the dry material through a 200 mesh screen to produce the phosphor. The phosphor product, upon excitation with an electron beam, emits red light having a peak wavelength at about 6260 A.

What is claimed is:

1. A method for preparing a luminescent material which comprises:

(a) heating at a temperature between 700 and 1250° C. a mixture including:

(i) at least one oxide of the group consisting of yttrium, gadolinium, lanthanum and lutetium,
(ii) a compound of europium; the molar ratio of the europium in said compound to the yttrium plus gadolinium plus lanthanum plus lutetium in said oxide being in the range of between about 0.001 and 0.1,
(iii) and a composition which yields alkali metal sulfides and polysulfides upon heating, said ingredients being present in said mixture in such proportions as to yield upon heating a luminescent europium activated oxysulfide of at least one of yttrium, gadolinium, lanthanum, and lutetium.

2. The method defined in claim 1 wherein said mixture also includes
(iv) at least one member of the group consisting of sulphates, phosphates, arsenate, and germanates of alkali metals.

3. The method defined in claim 2 wherein said mixture includes
(i) yttrium oxide
(ii) europium oxide
(iii) a composition which yields sodium sulfides and polysulfides upon heating,
(iv) and at least one member of the group consisting of phosphates of alkali metals.

4. A method of preparing a luminescent material which comprises:
(a) preparing a mixture consisting essentially of
(i) at least one oxide of the group consisting of yttrium, gadolinium, lathanum and lutetium,
(ii) a europium compound, the molar ratio of the europium in said compound to said lanthanum plus yttrium plus gadolinium plus lutetium in said oxide being between about 0.0001 and 0.1,
(iii) sulfur in elemental form, or as a sulfide or thiosulfate of an alkali metal,
(iv) at least one alkali metal as a compound thereof, said compound being a thiosulfate, or a carbonate, or a hydroxide,
(v) and optionally at least one member of the group consisting of sulfates, phosphates, arsenates and fermanated of at least one alkali metal, said ingredients being present in said mixture in such proportions as to yield upon heating a luminescent europium activated oxysulfide of at least one of yttrium, gadolinium, lanthanum, and lutetium,
(b) heating said mixture to a temperature between 700° and 1250° C., and then
(c) cooling said mixture.

5. The method defined in claim 4 wherein said mixture consists essentially of
(i) yttrium oxide,
(ii) a europium compound,
(iii) and at least one of sodium thiosulfate and potassium thiosulfate.

6. The method defined in claim 4 wherein said mixture consists essentially of
(i) yttrium oxide,
(ii) a europium compound,
(iii) elemental sulfur,
(iv) and at least one of lithium carbonate, sodium carbonate and potassium carbonate.

7. The method defined in claim 4 wherein said mixture consists essentially of:
(i) yttrium oxide,
(ii) a europium compound,
(iii) elemental sulfur,
(iv) at least one of sodium carbonate and potassium carbonate,
(v) and at least one of lithium phosphate, sodium phosphate, and potassium phosphate.

8. The method defined in claim 4 wherein said mixture consists essentially of
(i) yttrium oxide,
(ii) europium oxide,
(iii) elemental sulfur,
(iv) sodium carbonate,
(v) potassium phosphate.

9. The method defined in claim 4 wherein said mixture consists essetnially of:
(i) yttrium oxide,
(ii) a europium compound,
(iii) elemental sulfur,
(iv) at least one of sodium carbonate and potassium carbonate,
(v) and at least one of lithium germanate, sodium germanate and potassium germanate.

10. The method of claim 4 wherein said mixture consists essentially of:
(i) yttrium oxide,
(ii) a europium compound,
(iii) elemental sulfur,
(iv) at least one of sodium carbonate and potassium carbonate,
(v) and at least one of lithium arsenate, sodium arsenate, and potassium arsenate.

References Cited

UNITED STATES PATENTS

| | | | |
|---|---|---|---|
| 3,243,723 | 3/1966 | Van Uitert | 252—301.4 |
| 3,257,327 | 6/1966 | Nassau | 252—301.5 |
| 3,289,100 | 11/1966 | Ballman et al. | 252—301.4 |
| 3,418,246 | 12/1968 | Royce. | |
| 3,418,247 | 12/1968 | Yocom. | |

ROBERT D. EDMONDS, Primary Examiner

PO-1050
(5/69)

UNITED STATES PATENT OFFICE
CERTIFICATE OF CORRECTION

Patent No. 3,502,590     Dated  24 March 1970

Inventor(s) Martin R. Royce, S. M. Thomsen, P. N. Yocom

It is certified that error appears in the above-identified patent and that said Letters Patent are hereby corrected as shown below:

| | |
|---|---|
| Column 5, line 13 | change "." to --,-- |
| Column 5, after line 13 | insert --(b) and cooling said heated mixture.-- |
| Column 5, line 43 | "fermanated" should be --germanates-- |
| Column 6, line 28 | "essetnially" should be --essentially-- |

SIGNED AND
SEALED
AUG 18 1970

(SEAL)
Attest:

Edward M. Fletcher, Jr.
Attesting Officer

WILLIAM E. SCHUYLER, JR.
Commissioner of Patents